Dec. 15, 1959     R. G. HARTENSTEIN     2,917,264

VIBRATION AND SHOCK ISOLATION MOUNT

Filed April 26, 1956

WITNESSES
Edwin E. Bassler
Wm. B. Sellers.

INVENTOR
Raymond G. Hartenstein
BY
T. H. Murray
ATTORNEY

United States Patent Office 2,917,264
Patented Dec. 15, 1959

2,917,264

VIBRATION AND SHOCK ISOLATION MOUNT

Raymond G. Hartenstein, Ferndale, Md., assignor to Westinghouse Electric Corporation, East Pittsburgh, Pa., a corporation of Pennsylvania Application April 26, 1956, Serial No. 580,869

4 Claims. (Cl. 248—358)

This invention relates to means for preventing or damping transmission of vibration and shock from one body to another and more particularly to a compact and economical shock mount adaptable for use in replacing prior art shock mounts.

In a copending application Serial No. 554,889, filed December 22, 1955, there is described a novel flex-cable shock and vibration isolator assembly which will prevent or damp transmission of vibration and shock in all three planes. Essentially, the flex-cable isolator comprises a curved sheet of elastic material embedded with a plurality of flexible cables, the opposite ends of the cables being fastened to the respective bodies which are to be isolated.

Although the isolator shown and described in the above-entitled application was both practical and effective, there still remained a need for an isolator that could supplement prior art isolators in applications where their performance was unsatisfactory. Also, in certain applications an excessive amount of redesign work would be involved in incorporating the mount shown in the aforesaid application Serial No. 554,889 into existing equipment.

Accordingly, it is a primary object of this invention to provide a new and improved shock and vibration isolation mount.

More specifically, an object of the invention resides in the provision of a universal-type shock and vibration isolation mount which will require no redesign or modification of any equipment into which it can be incorporated.

A still further object of the invention lies in the provision of a shock and vibration isolation mount which is simple and economical in construction.

The above and other objects and features of the invention will become readily apparent from the following detailed description taken in connection with the accompanying drawings which form a part of this specification and in which.

Figure 1:
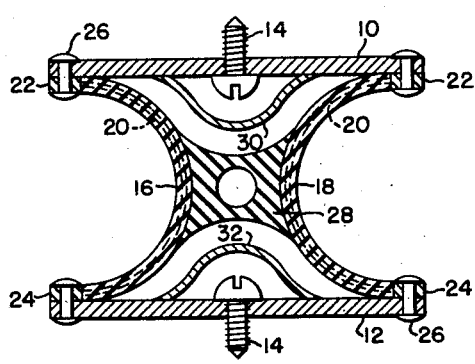
Figure 1 is a cross sectional view of the isolator of the invention in its unloaded or extended condition.
Figure 2:
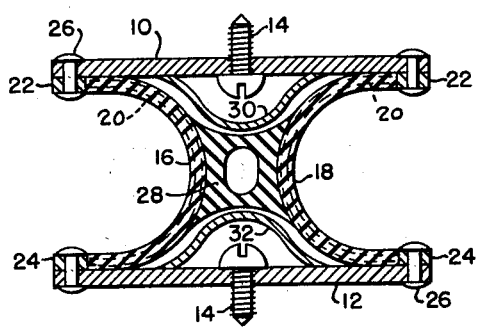
Fig. 2 is a cross sectional view similar to that of Fig. 1 except that the isolator is now shown in loaded or compressed condition.

Referring to Figs. 1 and 2, the isolator of the present invention includes two plate-like members 10 and 12 which are adapted for connection to the bodies which are to be isolated by screws 14 or other suitable fastening means. Between members 10 and 12 are two regions of flexible elastic material 16 and 18. Each of the regions is a cross section of a sheet of silicon rubber or the like embedded with a plurality of flexible cables 20 which are fastened to, and extend between, rigid supporting members 22 and 24. The supporting members are, in turn, fastened to the plate-like members 10 and 12 by rivets 26, substantially as shown. As is fully explained in copending application 560,481, filed January 23, 1956, now Patent No. 2,873,109, the assemblies 16 and 18 are usually fabricated by first fastening the cables 20 to members 22 and 24 and then sandwiching the cables between two sheets of rubber which are subsequently cemented together or vulcanized to form a composite member.

Between the convex faces formed by regions 16 and 18 is an elastic center damping device or shock damper 28 which is such as to control the bend radii of the cables in regions 16 and 18 to give them longer fatigue life. In addition, the damper acts against the metal restricters 30 and 32, fastened to members 10 and 12 respectively, to control the deflection of the mount under shock loading.

Figure 3:
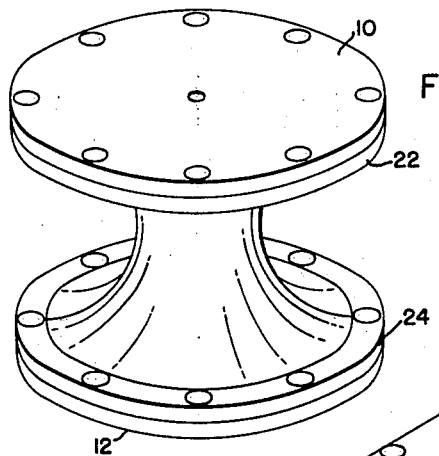
Fig. 3 is a perspective view of a circular embodiment of the invention.
Figure 4:
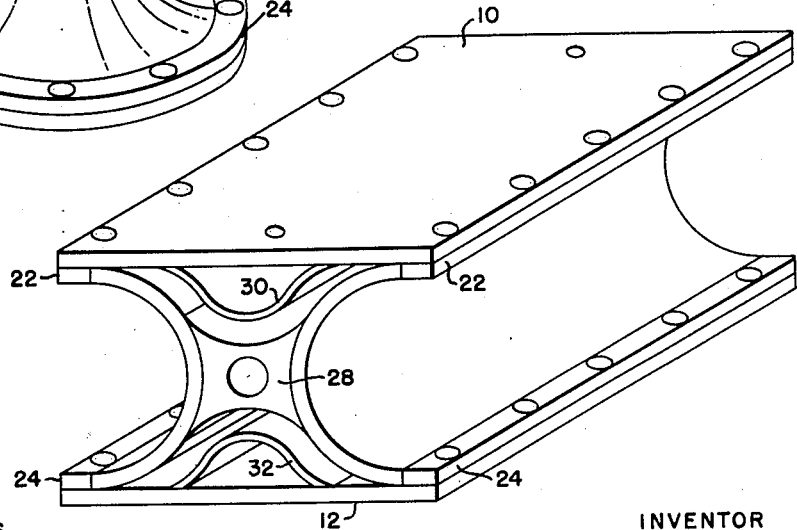
Fig. 4 is a perspective view of an elongated or rectangular embodiment of the invention.

In the embodiment of the invention shown in Fig. 3, the mount assumes a circular form. As an alternative it could be elliptical in shape. This mount can be readily interchanged with prior art mounts which are oftentimes circular in configuration. Where desirable, the elongated form shown in Fig. 4 may be used.

A theoretical discussion of the damping action of the mounts may be found in the aforesaid copending application Serial No. 554,889. For purposes of the present invention, however, it should be sufficient to state that especially good vibration isolation is achieved in all three planes with the present isolator.

Although the invention has been shown in connection with certain specific embodiments, it should be readily apparent to those skilled in the art that various changes in form and arrangement of parts can be made to suit requirements without departing from the spirit and scope of the invention.

I claim as my invention:

1. A shock and vibration isolation mount comprising first and second relatively-movable rigid members, two regions of flexible material interposed between said rigid members, each of said regions comprising a thin-walled section of elastic material embedded with flexible cables which extend lengthwise from one member to the other, said cables being connected at their opposite ends to the respective rigid members whereby the said regions are bent to assume substantially semi-circular cross-sectional configurations, said regions being placed between the rigid members in a manner such that the convex surfaces which they define face each other, an elastic member interposed between said convex surfaces whereby flexure of the cable-embedded sections will be resisted by compression of the elastic member therebetween during movement of the rigid members toward one another, and a projection on each of said rigid members extending inwardly toward said elastic member whereby substantial movement of such members toward one another will cause the projections to bottom thereagainst.

2. A shock and vibration isolation mount comprising first and second relatively-movable rigid members, two oppositely-arranged spaced-apart thin-walled flexible members interposed between said rigid members, each of said thin-walled flexible members comprising elastic material embedded with flexible cables which extend from one member to the other, each of said thin-walled members being bent at its center to form a substantially C-shaped cross section wherein the convex surfaces defined by such members face each other, and an elastic member interposed between said convex surfaces arranged to be compressed therebetween by flexure of same during movement of said rigid members one toward the other.

3. A shock and vibration isolation mount including first and second relatively-movable rigid members, means interconnecting said rigid members and comprising an annular thin-walled section of elastic material embedded with a plurality of flexible cables extending lengthwise between said rigid members, means connecting the opposite ends of said cables to the respective rigid members, said thin-walled section curving radially inward from opposite ends to a mid-portion of substantially reduced diameter, and an elastic member disposed within said mid-portion arranged to be compressed radially inward by contraction of such mid-portion during movement of said rigid members one toward the other.

4. A shock and vibration isolation mount including first and second relatively-movable rigid members, means inter-connecting said rigid members and comprising an annular thin-walled section of elastic material having a plurality of flexible cables embedded therein extending lengthwise between said rigid members, means for fastening the opposite ends of said cables to the respective rigid members, said section curving radially inward from opposite ends to a mid-portion of substantially reduced diameter.

References Cited in the file of this patent
UNITED STATES PATENTS

| | | |
|---|---|---|
| Re. 22,280 | Lord | Mar. 2, 1943 |
| 1,696,504 | Pettus | Dec. 25, 1928 |
| 1,671,764 | Dickey | May 29, 1928 |
| 2,447,712 | Nathan | Aug. 24, 1948 |
| 2,693,925 | Mirly | Nov. 9, 1954 |
| 2,697,578 | Whittam | Dec. 21, 1954 |

FOREIGN PATENTS

| | | |
|---|---|---|
| 406,856 | Italy | Aug. 1, 1944 |